United States Patent
Janakiram

(10) Patent No.: US 9,507,934 B2
(45) Date of Patent: Nov. 29, 2016

(54) FILTERING MECHANISM FOR SECURING LINUX KERNEL

(71) Applicant: Indian Institute of Technology Madras, Chennai, State of Tamil Nadu (IN)

(72) Inventor: Dharanipragada Janakiram, Chennai (IN)

(*) Notice: Subject to any disclaimer, the term of this patent is extended or adjusted under 35 U.S.C. 154(b) by 40 days.

(21) Appl. No.: 14/568,668

(22) Filed: Dec. 12, 2014

(65) Prior Publication Data

US 2015/0169865 A1   Jun. 18, 2015

(30) Foreign Application Priority Data

Dec. 13, 2013   (IN) .......................... 5777/CHE/2013

(51) Int. Cl.
*G06F 21/53* (2013.01)

(52) U.S. Cl.
CPC ..................... *G06F 21/53* (2013.01)

(58) Field of Classification Search
CPC .......... G06F 21/00; G06F 21/50; G06F 21/52–21/54; G06F 21/60; G06F 21/62; G06F 21/6218; G06F 21/6281; G06F 21/629; G06F 2221/2141; G06F 2221/2149
See application file for complete search history.

(56) References Cited

U.S. PATENT DOCUMENTS

| | | | | |
|---|---|---|---|---|
| 6,282,703 | B1* | 8/2001 | Meth .......................... | G06F 8/54 717/163 |
| 7,085,928 | B1* | 8/2006 | Schmid .................... | G06F 21/51 713/164 |
| 7,591,003 | B2 | 9/2009 | Focke et al. | |
| 7,644,271 | B1 | 1/2010 | Cherepov et al. | |
| 7,685,638 | B1* | 3/2010 | Buches .................... | G06F 21/53 726/22 |
| 7,992,156 | B1* | 8/2011 | Wang ...................... | G06F 21/565 713/164 |
| 8,706,798 | B1* | 4/2014 | Suchter .................. | G06F 9/5038 709/202 |
| 2003/0005168 | A1* | 1/2003 | Leerssen ............. | G06F 11/3466 719/313 |
| 2004/0088684 | A1* | 5/2004 | Gazdik ............... | G06F 9/44521 717/133 |
| 2005/0108516 | A1* | 5/2005 | Balzer ..................... | G06F 21/52 713/150 |
| 2005/0216895 | A1* | 9/2005 | Tran ...................... | G06F 11/362 717/127 |
| 2006/0075462 | A1* | 4/2006 | Golan ..................... | G06F 21/54 726/1 |

(Continued)

OTHER PUBLICATIONS

Ellingwood, Justin "How to Use ps, kill, and nice to Manage Processes in Linux" [Online], Sep. 6, 2013 [Retrieved on: Mar. 15, 2016], www.digitalocean.com, Retrieved from: < https://www.digitalocean.com/community/tutorials/how-to-use-ps-kill-and-nice-to-manage-processes-in-linux >.*

*Primary Examiner* — Eric W Shepperd
(74) *Attorney, Agent, or Firm* — Seyfarth Shaw LLP; Brian Michaelis

(57) ABSTRACT

Systems and methods for providing security to the Linux kernel are described. Wrappers are provided around the kernel, thereby reducing the amount of testing needed since the new security code will be introduced only into the wrappers. This also provides flexibility in various layers. The filters may be customized per se to suit various security needs. Overhead incurred due to this is very low.

9 Claims, 3 Drawing Sheets

(56) References Cited

U.S. PATENT DOCUMENTS

| | | | | |
|---|---|---|---|---|
| 2006/0075469 A1* | 4/2006 | Vayman | G06F 21/57 | 726/2 |
| 2006/0095895 A1* | 5/2006 | K. | G06F 11/28 | 717/130 |
| 2006/0187830 A1* | 8/2006 | Nam | H04L 12/5693 | 370/229 |
| 2007/0050369 A1* | 3/2007 | Stiegler | G06F 21/53 | |
| 2007/0288568 A1* | 12/2007 | Hayter | G06F 9/541 | 709/204 |
| 2008/0022353 A1 | 1/2008 | Mayer et al. | | |
| 2008/0291279 A1* | 11/2008 | Samarasekera | G08B 13/19693 | 348/159 |
| 2009/0077362 A1* | 3/2009 | Taylor | G06F 21/10 | 713/1 |
| 2010/0218201 A1* | 8/2010 | Schneider | G06F 21/57 | 719/330 |
| 2010/0250903 A1* | 9/2010 | Jensen | G06F 9/541 | 712/220 |
| 2010/0333206 A1* | 12/2010 | Dewan | G06F 21/53 | 726/26 |
| 2011/0047542 A1 | 2/2011 | Dang et al. | | |
| 2011/0125799 A1* | 5/2011 | Kandasamy | G06F 21/6218 | 707/785 |
| 2011/0138476 A1* | 6/2011 | Black | G06F 9/468 | 726/27 |
| 2012/0324484 A1* | 12/2012 | Fried | G06F 9/44521 | 719/331 |
| 2013/0263278 A1* | 10/2013 | Bauch | G06F 21/6209 | 726/26 |
| 2014/0007139 A1* | 1/2014 | Janssen | G06F 9/4411 | 719/321 |
| 2014/0007184 A1* | 1/2014 | Porras | G06F 21/53 | 726/1 |
| 2014/0149781 A1* | 5/2014 | Horman | G06F 9/545 | 714/2 |

\* cited by examiner

FILTERING MECHANISM FOR SECURING LINUX KERNEL

CROSS-REFERENCE TO RELATED APPLICATION DATA

This non-provisional application claims priority to India application no. 5777/CHE/2013 filed on Dec. 13, 2013.

FIELD

This disclosure relates generally to computer security and, more particularly, to the use of message filters for enforcing security policies without changing the kernel code.

BACKGROUND

Generally, Linux provides user-level security policies by distinguishing root users from unprivileged users. Applications in Linux can run in either user or kernel mode. The kernel itself may be composed of two major parts, the core kernel and various loadable modules.

The Linux kernel, which is open source, is subject to various attacks by unauthorized applications in the user space. Various methods have been proposed for protecting the Linux kernel against various vulnerabilities. However, many of the proposed methods require changes to the kernel itself, leading to long testing and debugging periods, and also running the risk of introducing new bugs. For instance, attempts have been made to secure the Linux kernel by hardening it, which may include modifying the kernel or implementing loadable kernel modules. When modifying the kernel, the kernel source itself is modified to add desired functionality. While this tackles security issues at their root, this typically needs to be followed up with rigorous testing of both the modified part, as well as dependent parts of the modified part. By implementing loadable kernel modules, desired functions are provided on top of the Linux kernel in the form of dynamically loadable modules. While this saves the cumbersome task of modifying the kernel source followed by stringent testing, the kernel functionality is not modified and, as such, limitations exist.

U.S. Pat. No. 7,644,271 discloses a method and computer program product for providing enforcement of security policies for kernel module loading. File paths for shared library executable files opened by user processes are cached. When a request to load a kernel loadable module (KLM) is received, a previously cached file path for the KLM is retrieved, the file path mapping a location of an executable file from which said KLM was produced. A security policy is applied to the file path, wherein when the file path triggers a security policy rule then an action associated with a triggered rule is taken, and wherein when the file path does not trigger a security policy rule then the KLM request is allowed to proceed.

U.S. Pat. No. 7,591,003 discloses a computer system that offers Linux® compatibility and supports contemporary hardware speeds. It is designed to require no porting of common applications that run on Linux so it is easy to develop for and allows the use of a wide variety of modern development tools. The system is further designed to meet or exceed the Common Criteria EAL-5 or higher rating through incorporation of required security features, as well as a very high level of assurance for handling data at a wide range of sensitivity, e.g., classification, levels in a wide range of operational environments. This is achieved through the implementation of a layered operating system which has been designed from the ground up to enforce security, but which also supports Linux operating system functions and methods.

U.S. patent application publication no. 2011/0047542 discloses a method that, in one example implementation, includes intercepting a request associated with an execution of an object, e.g., a kernel module or a binary, in a computer configured to operate in a virtual machine environment. The request is associated with a privileged domain of the computer that operates logically below one or more operating systems. The method also includes verifying an authorization of the object by computing a checksum for the object and comparing the checksum to a plurality of stored checksums in a memory element. The execution of the object is denied if it is not authorized. In other embodiments, the method can include evaluating a plurality of entries within the memory element of the computer, wherein the entries include authorized binaries and kernel modules. In other embodiments, the method can include intercepting an attempt from a remote computer to execute code from a previously authorized binary.

U.S. patent application publication no. 2008/0022353 discloses a method and computer program product for developing a security-enhanced application that runs on a flexible and configurable mandatory access control (MAC) operating system. The security-enhanced application separates resource information from processes and processes from each other. The security-enhanced application also includes a set of rules that control information flow between the resource information and processes. The method includes the following. First, user input is received that represents at least one abstract security principle. Then, the user input is translated into policy language using a framework dictionary, wherein the policy language specifies a policy that determines allowed access for the flexible and configurable MAC operating system.

SUMMARY

The present disclosure proposes an object oriented message filter model for the Linux kernel that enables dynamically loading modules to provide various filtering capabilities to the kernel, transparent to user applications. It filters all requests before being serviced by the kernel based on certain specified rules.

BRIEF DESCRIPTION OF THE DRAWINGS

The particular features and advantages of the present disclosure will be apparent from the detailed description set forth below in conjunction with the drawings in which like reference characters identify corresponding aspects throughout.

DETAILED DESCRIPTION

Figure 1:
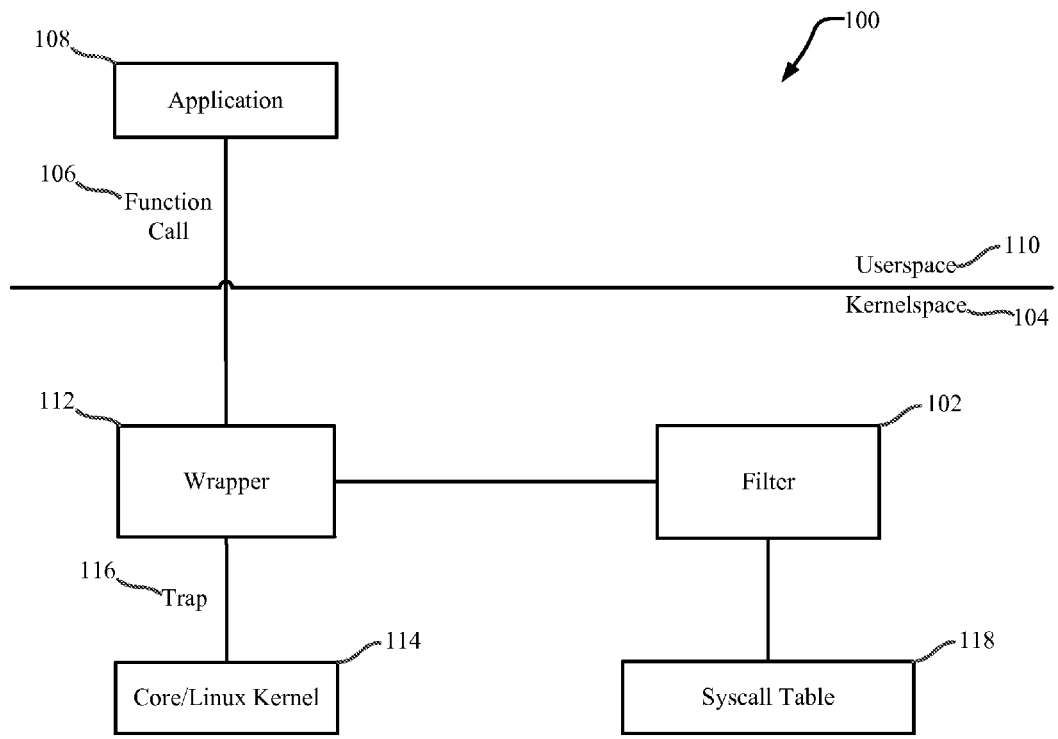
FIG. 1 is a block diagram of a device for safeguarding the Linux kernel according to the present disclosure.

The detailed description set forth herein makes reference to the accompanying drawings, which show various aspects of the present disclosure by way of illustration. While these various aspects are described in sufficient detail to enable those skilled in the art to practice the disclosure, it should be understood that other embodiments and implementations may be realized and that logical and mechanical changes may be made without departing from the scope of the disclosure. Thus, the detailed description herein is presented for purposes of illustration only and not of limitation. For example, the steps recited in any of the method or process descriptions may be executed in any order and are not limited to the order presented. Moreover, references to a singular embodiment may include plural embodiments, and references to more than one component may include a singular embodiment, for example.

The present disclosure provides a method for safeguarding the Linux kernel, without modifying it, by providing wrappers around the kernel. This reduces the amount of testing needed since new security code is introduced only into the wrappers. It also provides flexibility in various layers. Filters, having rather low overhead, may be customized per se to suit various security needs.

According to the present disclosure, user-level authentication may be enabled passively. This authentication may be used when system calls are invoked on sensitive data. Further, device driver failures may be handled by early detection. A filter may be added to the driver, which checks for illegal values in certain developer-specified fields of an incoming message and filters all faulty messages.

Message filters rely on detection and avoidance. According to the present disclosure, a generic model that merely filters messages as they are encountered on the basis of specified rules may be utilized. The onus is on the developer to specify rules for the proper functioning of the system.

Without modifying the kernel source, the behavior of the kernel may be modified, thereby saving debugging and testing hours. The overhead incurred due to these filters is minimal. Since it merely acts as a gatekeeper and does not place traps at individual functions inside the kernel, it is very light weight and easily configurable.

According to the present disclosure, a wrapper-based filtering mechanism for the Linux kernel may filter and stop messages from faulty and malicious applications from reaching the kernel. The filter may be transparent and the existing functionality of the system may not be compromised. Additionally, the wrappers may be used for further development of kernel modules like device drivers, which are inherently easy to maintain and use.

The present disclosure has various benefits. For instance, it involves a model that enables real-time monitoring. Further, it is safe from user manipulation since the wrappers are in kernel space. Additionally, there is flexibility in choosing and enforcing various security policies. Moreover, user applications are oblivious to the wrappers and it is an easy way to add object-oriented kernel extensions.

The present disclosure allows for the dynamic loading of message filters. This may involve object-oriented wrappers. Furthermore, messages are filtered before they reach the kernel. The present disclosure also provides for the flexibility to add wrappers at various points, based on requirements. Moreover, the present disclosure also provides for easy extensibility to add new filters.

Referring to FIG. 1, a device 100 for safeguarding the Linux kernel is described. The device 100 includes a filter 102 in the kernelspace 104. The filter 102 may be realized as a decorator class implementation of C++ wrapper classes. A policy may be added for each decorator class, which determines preconditions. The filter 102 intercepts all function calls (collectively represented by the function call 106) sent from applications (collectively represented by the application 108) within the user space 110, to the kernelspace 104. The application 108 on the device 100 may send the function call 106 to a wrapper 112. The wrapper 112 may be based on Object Oriented wrappers for a linux kernel 114. The wrapper 112 allows for transparent loading and unloading of the filter 102.

When an unauthorized function call 106 is made from the userspace 110, a trap 116 is issued to the Linux kernel 114. Function in the syscall table 118, corresponding to the unauthorized function call 106, may be invoked. This function is the filter 102 function. The filter 102 thereby triggers corresponding actions according to specified polices. Based on the result, the wrapper 112 may call the original kernel function.

The syscall table 118 may be modified to point to the filter function instead of the kernel function. Since this is invisible to the user, the whole mechanism is transparent. The filter object may be invoked dynamically based on the environment. The number of filter objects is not limited and new filter objects may be declared for new functionalities and policies.

Figure 2:
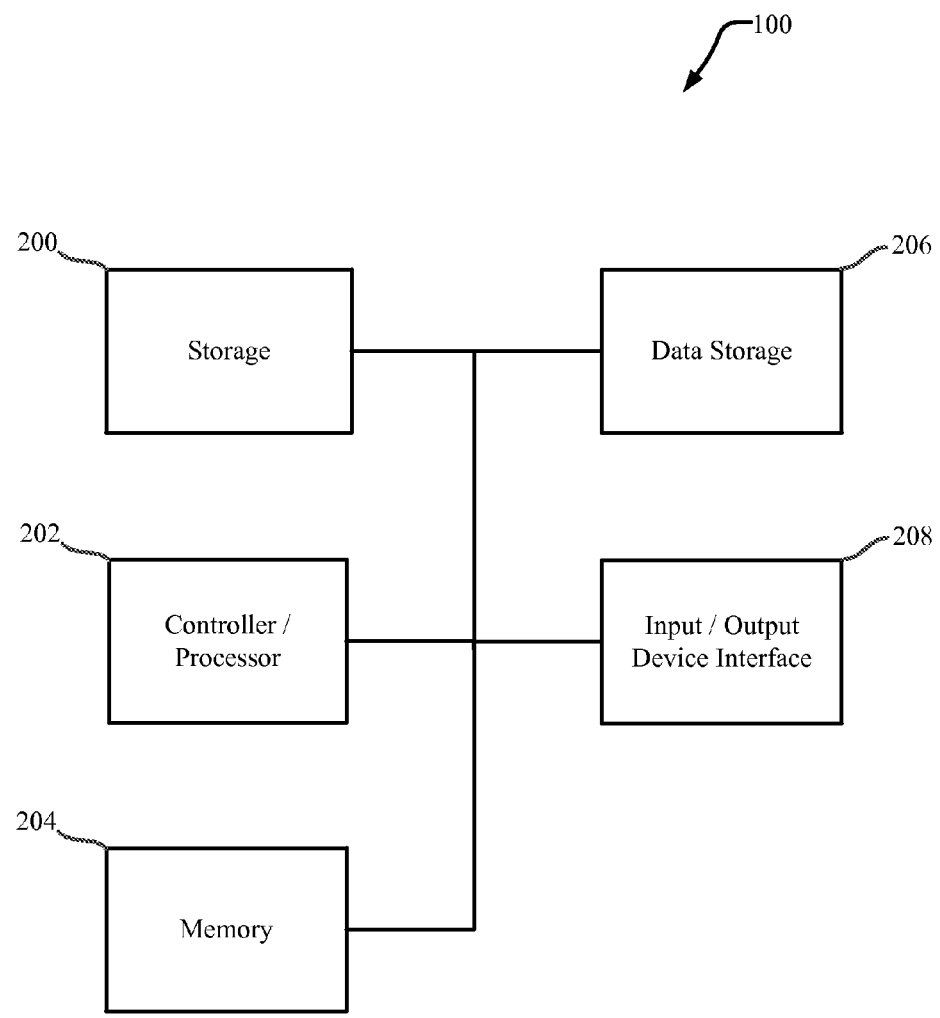
FIG. 2 is a block diagram of a device according to the present disclosure.

FIG. 2 illustrates a block diagram having example components of the device 100 according to the present disclosure. The device 100 may include computer-readable and computer-executable instructions that reside in a storage 200 on the device 100. The device 100 may be a smart device, such as a smart object capable of connecting to a network or the internet. Examples of smart devices may include computers (e.g., a desktop, a laptop, a server or the like) and portable devices (e.g., an electronic reader, smart phone, tablet, smart watch or the like), for example.

The device 100 may include one or more controllers/processors 202 comprising one-or-more central processing units (CPUs) for processing data and computer-readable instructions and a memory 204 for storing data and instructions. The memory 204 may include volatile random access memory (RAM), non-volatile read only memory (ROM), non-volatile magnetoresistive (MRAM) and/or other types of memory. The device 100 may also include a data storage component 206 for storing data and processor-executable instructions. The data storage component 206 may include one or more non-volatile storage types such as magnetic storage, optical storage, solid-state storage, etc. The device 100 may also be connected to a removable or external non-volatile memory and/or storage through input/output device interfaces 208. The input/output device interfaces 208 may be configured to operate with a network, for example a wireless local area network (WLAN) (such as WiFi), Bluetooth, zigbee and/or wireless networks, such as a Long Term Evolution (LTE) network, WiMAX network, 3G network, etc. The network may include a local or private network or may include a wide network such as the Internet. Devices may be connected to the network through either wired or wireless connections.

Depending upon complexity of the device 100, the device 100 may omit components illustrated in FIG. 2 or may include other components not illustrated.

Executable instructions for operating the device 100 and its various components may be executed by the controller(s)/processor(s) 202, using the memory 204 as temporary "working" storage at runtime. The executable instructions may be stored in a non-transitory manner in non-volatile memory 204, storage 200, or an external device. Alternatively, some or all of the executable instructions may be embedded in hardware or firmware in addition to or instead of software.

The concepts disclosed herein may be applied within a number of different devices and computer systems, including, for example, laptop computers, cellular phones, personal digital assistants (PDAs), tablet computers, wearable computing devices (watches, glasses, etc.), other mobile devices, etc.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Figure 3:
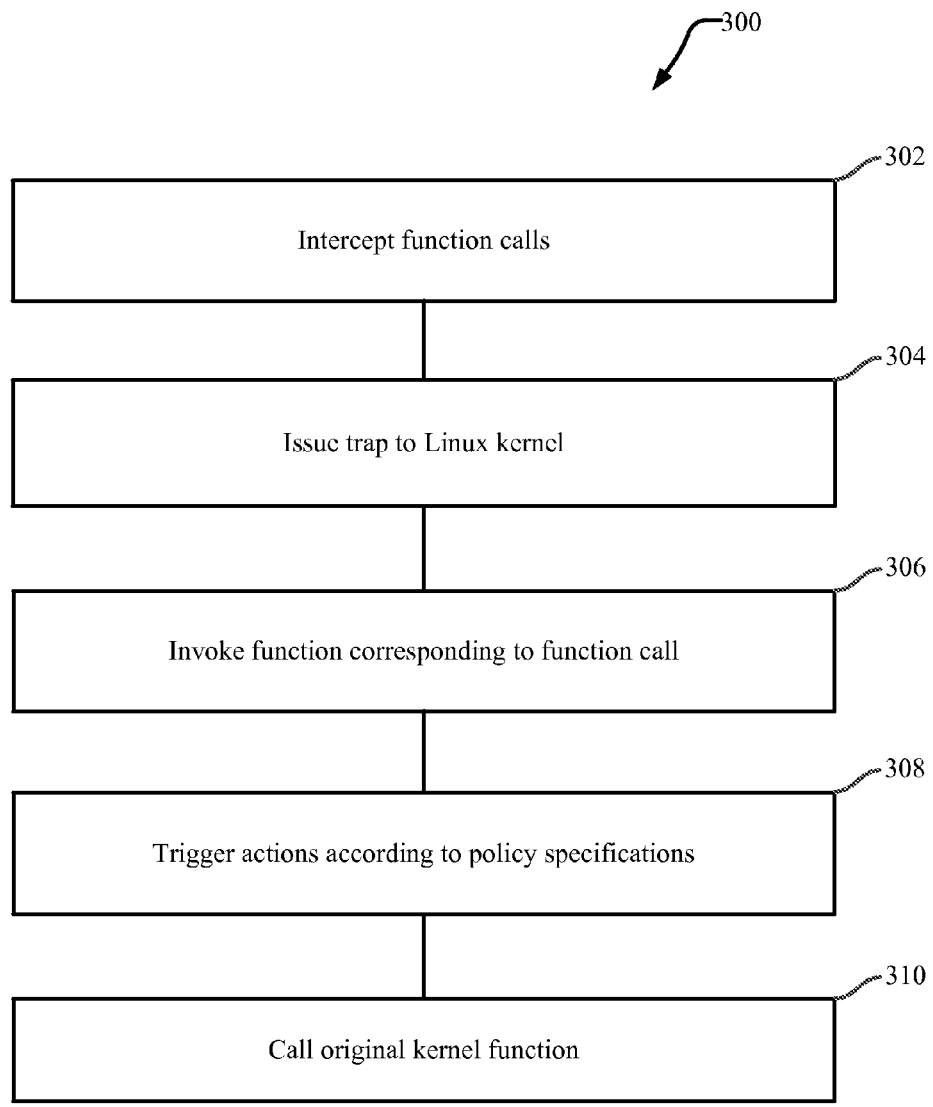
FIG. 3 is a process flow diagram of a method for securing the Linux kernel based on dynamically loadable message filters according to the present disclosure.

FIG. 3 illustrates a method 300 for securing the Linux kernel based on dynamically loadable message filters. At block 302 message filters intercept function calls sent from a userspace. At block 304 a trap is issued to the Linux kernel. The trap may be issued to the Linux kernel when the function call is unauthorized. At block 306 function corresponding to the function call in a syscall table is invoked. This function may be a filter function. At block 308 actions are triggered by a filter according to policy specifications. At block 310 an original kernel function is called by a wrapper.

As used in this disclosure, the term "a" or "one" may include one or more items unless specifically stated otherwise. Further, the phrase "based on" is intended to mean "based at least in part on" unless specifically stated otherwise.

The present disclosure is in no way restricted to the specific disclosure of the specification and drawings, but also encompasses any modifications within the scope of the appended claims.

What is claimed is:

1. A device for safeguarding a Linux kernel comprising:
a processor;
a memory storing instructions to be executed by the processor;
applications;
a core kernel;
a wrapper in communication with the core kernel, the wrapper being object oriented; and
a filter in communication with the wrapper and the core kernel, the filter only in indirect communication with all of the applications via the wrapper, the filter being dynamically loadable, the filter further being capable of intercepting function calls prior to the function calls accessing the core kernel.

2. The device of claim 1 further comprising:
a syscall table in communication with the filter.

3. The device of claim 1 further comprising:
a userspace and a kernelspace.

4. The device of claim 3 wherein the userspace includes an application that issues the function calls.

5. The device of claim 3 wherein the kernelspace includes the wrapper, the filter, and the core kernel.

6. The device of claim 1 wherein the filter is realized as a decorator class.

7. The device of claim 6 wherein a policy is added for each decorator class, each of the policy for each decorator class being capable of determining preconditions.

8. The device of claim 1 wherein the wrapper is capable of issuing a trap to the core kernel when an intercepted function call is unauthorized.

9. A method for securing a Linux kernel based on dynamically loadable message filters comprising the steps of:
intercepting, by a message filter, function calls sent from applications located in a userspace;
issuing, by a wrapper, a trap to a core kernel when an intercepted function call is unauthorized;
dynamically invoking, by a syscall table, a filter function of the filter corresponding to the intercepted function call, the filter being only in indirect communication with all of the applications via the wrapper;
triggering, by the message filter, actions according to policy specifications; and
calling, by the wrapper, an original kernel function.

\* \* \* \* \*